(12) United States Patent
Gerresheim et al.

(10) Patent No.: US 6,796,350 B1
(45) Date of Patent: Sep. 28, 2004

(54) VEHICLE TIRE HAVING NON-UNIFORMLY PROFILED TREAD WITH RESPECT TO ITS CENTER

(75) Inventors: Manfred Gerresheim, Oberthausen (DE); Klaus Riehl, Grundau (DE); Saburo Miyabe, Grossauheim (DE); Hideaki Sugihara, Amagasaki (JP)

(73) Assignee: Dunlop GmbH, Hanau (DE)

( * ) Notice: Subject to any disclaimer, the term of this patent is extended or adjusted under 35 U.S.C. 154(b) by 109 days.

(21) Appl. No.: 09/806,006

(22) PCT Filed: Jul. 14, 2000

(86) PCT No.: PCT/IB00/01150
§ 371 (c)(1),
(2), (4) Date: Apr. 17, 2001

(87) PCT Pub. No.: WO01/07270
PCT Pub. Date: Feb. 1, 2001

(30) Foreign Application Priority Data

Jul. 26, 1999 (DE) .......................................... 199 35 052
Aug. 27, 1999 (DE) .......................................... 199 40 777

(51) Int. Cl.⁷ ......................... B60C 11/03; B60C 11/13; B60C 101/00; B60C 111/00
(52) U.S. Cl. ............................. 152/209.9; 152/209.19; 152/209.26; 152/209.27
(58) Field of Search ......................... 152/209.8, 209.9, 152/209.18, 209.19, 209.26, 209.27

(56) References Cited

U.S. PATENT DOCUMENTS

| | | | |
|---|---|---|---|
| 3,286,756 A | 11/1966 | Ellenrieder | |
| 3,682,220 A | * 8/1972 | Verdier | |
| 4,546,808 A | 10/1985 | Fontaine et al. | |
| 4,687,037 A | 8/1987 | Pfeiffer et al. | |
| 5,327,952 A | * 7/1994 | Glover et al. | |
| 5,358,022 A | 10/1994 | Glover et al. | |
| 5,360,043 A | * 11/1994 | Croyle et al. | ............ 152/209.9 |
| 5,425,406 A | * 6/1995 | Swift et al. | |
| 5,603,785 A | * 2/1997 | Weber et al. | |
| 5,679,185 A | * 10/1997 | Tanaka | |
| 6,119,745 A | * 9/2000 | Sugihara | |

FOREIGN PATENT DOCUMENTS

| | | | |
|---|---|---|---|
| DE | 611667 | * | 8/1994 |
| EP | 0402595 | | 12/1990 |
| EP | 594380 | * | 4/1994 |
| EP | 646480 | * | 4/1995 |
| EP | 676305 | * | 10/1995 |
| EP | 0686516 | | 12/1995 |
| EP | 710577 | * | 5/1996 |
| EP | 738616 | * | 10/1996 |
| FR | 2484336 | | 12/1981 |

* cited by examiner

Primary Examiner—Steven D. Maki
(74) Attorney, Agent, or Firm—Birch, Stewart, Kolasch & Birch, LLP

(57) ABSTRACT

A vehicle tire having a non-uniformly profiled tread with respect to its center, with a circumferential extending superwide groove having a width of at least 30 mm provided in one half of the tread and two further circumferential grooves which are narrower in comparison thereto and which have at most a width of 15 mm being provided in the other tread half.

12 Claims, 4 Drawing Sheets

VEHICLE TIRE HAVING NON-UNIFORMLY PROFILED TREAD WITH RESPECT TO ITS CENTER

This application is the national phase under 35 U.S.C. § 371 of PCT International Application No. PCT/IB00/01150 which has an International filing date of Jul. 14, 2000, which designated the United States of America and was published in English.

TECHNICAL FIELDS

The invention relates to a vehicle tyre having a non-uniformly profiled tread with respect to its centre.

In the design of the tread pattern of vehicle tyres an attempt must always be made to take account of a plurality of partly mutually contradicting requirements, such as for example the aquaplaning or hydroplaning behaviour, the tread wear, the noise generation, the handling characteristics and the like.

BACKGROUND ART

It is known to design the tread patterns with broad grooves to improve the aquaplaning behaviour, in particular with a very broad groove at the centre of the tread or with two comparatively broad grooves on both sides of the centre of the tread. These known tread designs are, however, associated with the disadvantage that the improvement of the aquaplaning or hydroplaning behaviour, associated with the broadening of the circumferential grooves, leads to a deterioration of characteristics which are important in the same manner for the assessment of the relevant tyre, such as above all the handling and the noise generation and/or the passing noise.

The object of the invention is to so design the tread of a vehicle tyre while generally ensuring good handling characteristics that at a the same time provide a very good aquaplaning or hydroplaning behaviour and low passing or passing-by noise.

DISCLOSURE OF THE INVENTION

According to the invention there is provided a vehicle tyre having a non-uniformly profiled tread with respect to its centre, characterised in that one tread half, in particular the inwardly disposed tread half related to the vehicle, has at least one circumferential superwide groove having a width of at least 30 mm and the other tread half, in particular the outwardly disposed tread half, has at least two narrower grooves in comparison thereto which likewise extend over the tyre circumference, with the superwide groove being at least twice as broad as the broadest of the narrower grooves.

Through the combination of a super-wide circumferential groove disposed in one half of the tyre tread with at least two narrower grooves in comparison thereto which are disposed in the other tread half, one succeeds, in surprising manner, in ensuring a good aquaplaning behaviour with a low passing noise, in particular avoiding the feared so-called organpipe noise when using circumferential grooves, i.e. the occurrence of resonant frequencies in the 1 kHz range.

The width of the superwide groove preferably amounts to at least approximately 30 mm and in particular to more than 35 mm, whereas the narrower grooves have a width of 15 mm or less, more preferably 10 mm and less.

Extensive freedom exists with respect to the tread design using grooves and fine cuts or sipes in the raised tread surface regions between and to the side of the circumferential grooves. Grooves extending obliquely with respect to the circumferential plane of the tyre, are, however, preferably used in order to avoid the striking of edges of the grooves in the tread contact patch. Fine cuts or lamella cuts can, however, also be provided extending in the transverse direction.

In the overall design of the tread pattern, attention should be paid to the fact that the positive component of the tread in the outer region is larger than in the inner region with respect to the vehicle in order to take account of the handling behaviour.

In accordance with a preferred embodiment of the invention, at least the narrower circumferential grooves are connected to one another by continuously curved grooves which extend obliquely with respect to the central plane of the tyre and which preferably extend from the tyre shoulder up to and into the vicinity of the superwide groove, with their inclination relative to the circumferential direction decreasing towards the tyre shoulder.

BRIEF DESCRIPTION OF DRAWINGS

Further advantageous variants of the invention are set forth in the subordinate claims and will be explained in the description of embodiments with reference to the drawing, in which are shown:

MODE FOR CARRYING OUT THE INVENTION

Figure 1:
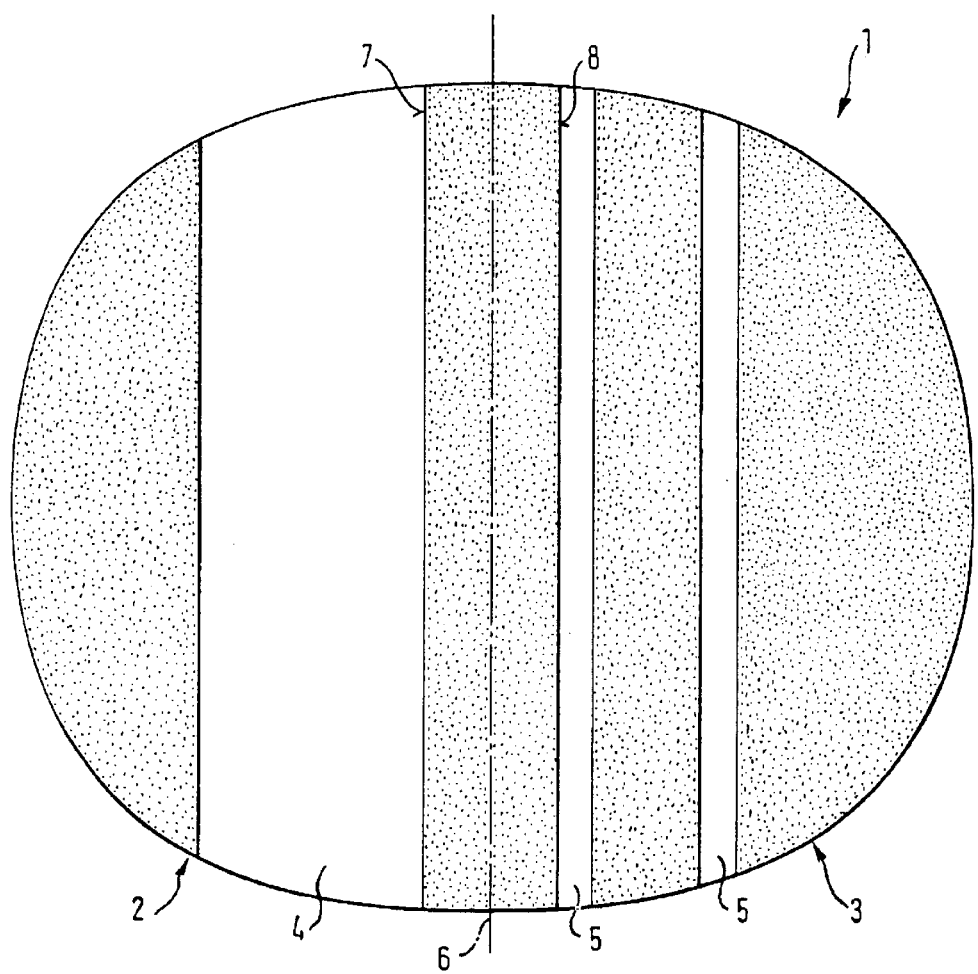
FIG. 1 the tread contact patch of the vehicle tyre tread pattern formed in accordance with the basic concept of the present invention.

FIG. 1 shows a tyre contact patch of a vehicle tyre in accordance with the invention, with the inwardly disposed tread half with respect to the direction of vehicle travel being characterised by the reference numeral 2 and the outwardly disposed tread half with the reference numeral 3. The vehicle tyre of the invention has circumferential grooves 4, 5 on both sides of the central plane 6 of the tyre, with it being important that two types of such circumferential groups are used, namely a superwide circumferential groove 4 and, in comparison thereto, significantly narrower circumferential grooves 5. The superwide circumferential groove 4 is arranged away from the centre 6, and indeed preferably in the inwardly disposed tread half 2. The width of the superwide circumferential groove should amount to at least 30 mm and will, as a rule, lie in the range between 35 and 50 mm.

The less wide circumferential grooves 5, which can have the same or also differing widths from one another, should have a width smaller than approximately 15 mm and lie preferably in the range from 12 to 4 mm.

In the embodiment of FIG. 1 the spacings of the respective inwardly disposed side walls 7, 8 of the superwide groove 4 and of the groove 5 adjacent to it from the central plane 6 of the tyre are selected to be at least substantially the same.

Figure 2:
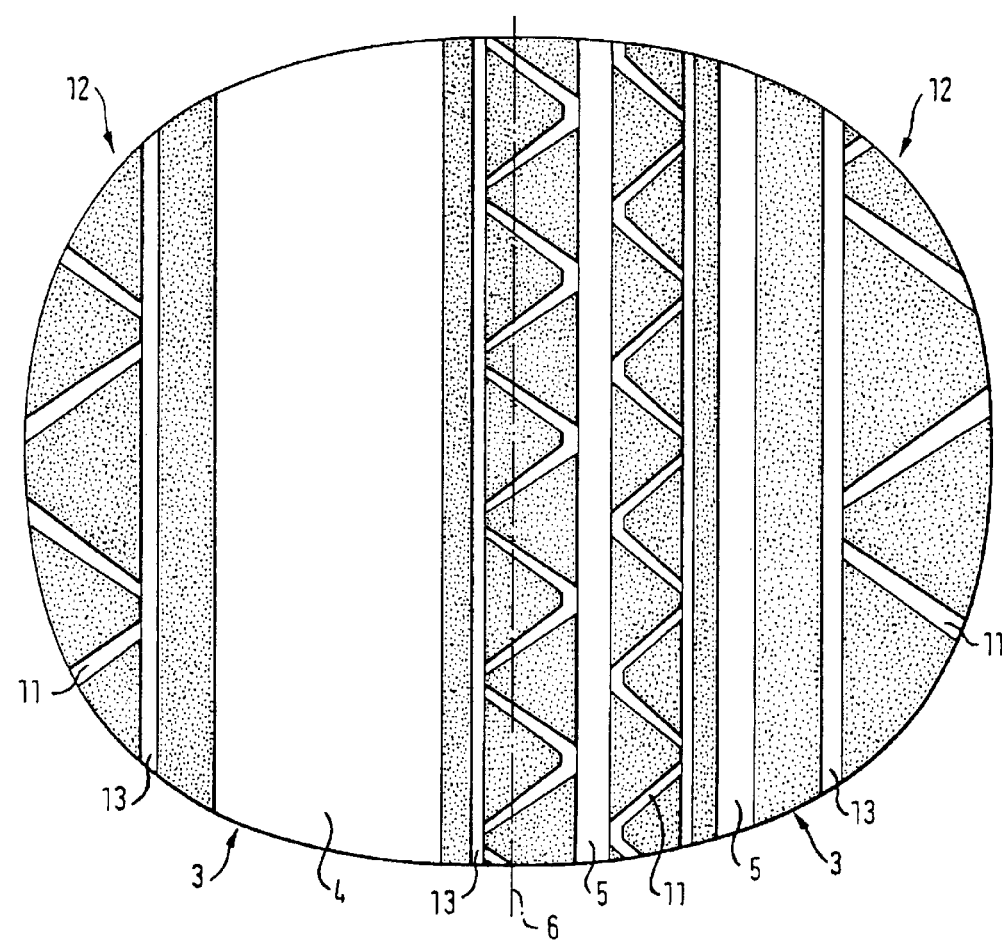
FIG. 2 a tread contact patch in accordance with FIG. 1 with additional patterning.

FIG. 2 shows the tyre contact patch in accordance with FIG. 1, with additional oblique grooves 11 and additional circumferentially extending narrow grooves 13 provided in the groove free regions and with their widths being significantly smaller and preferably at most half as large as the width of the circumferential grooves 5 associated with the superwide circumferential groove 4 and with them preferably being located in the tread half at the outer side of the tyre.

Through the inclined grooves a structure of inter-engaging, approximately equally sized, triangular blocks is provided in the central tread region, with the grooves communicating with at least one circumferentially extending groove and thus assisting the water dissipation in the tread contact patch in the region of the narrow grooves 5, 13.

The shoulder regions 12 are designed in such a manner that they have a relatively high positive component of tread pattern, in order to ensure the required handling behaviour. In the illustrated embodiment a narrow circumferential groove 13 and inclined grooves 11, which respectively communicate therewith and extend to the outer edge of the tread contact patch, are respectively provided in these regions, with the narrow grooves 11 preferably diverging to the outer edge of the shoulder regions.

Figure 3:
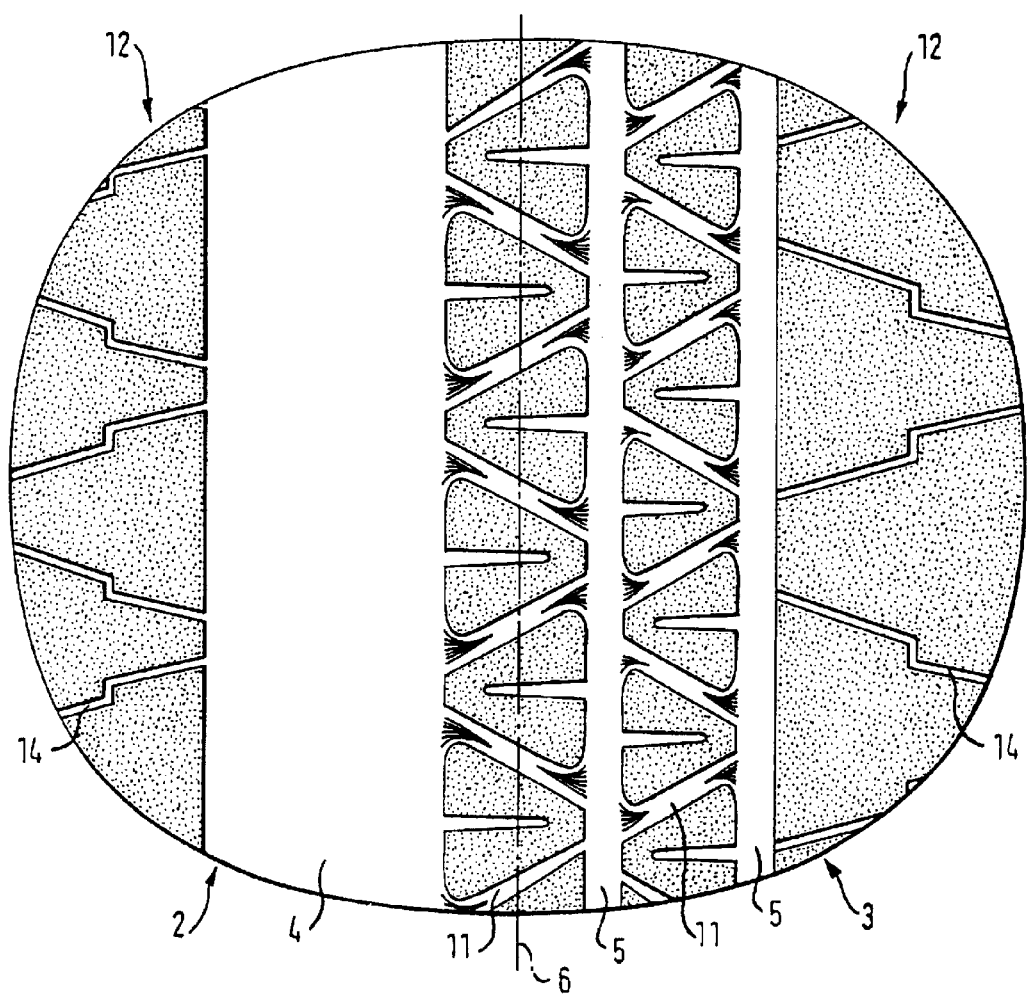
FIG. 3 a tread contact patch in accordance with FIG. 1 with a further variant of an additional patterning.

The embodiment of FIG. 3 is distinguished from the embodiment of FIG. 2 in that the shoulder regions are subdivided by inclined grooves of lower width or lamella cuts into individual blocks and thus a particularly high positive component is present, whereas the superwide groove 4 and the two narrower ribs 5 which are disposed on both sides of the central circumferential plane 6 communicate with one another by inclined grooves which leads to the formation of substantially triangular blocks.

As already mentioned, the combination of a superwide groove with at least two narrower circumferential grooves is of importance for the invention, whereas the additional tread pattern design permits a large number of variants.

Figure 4:
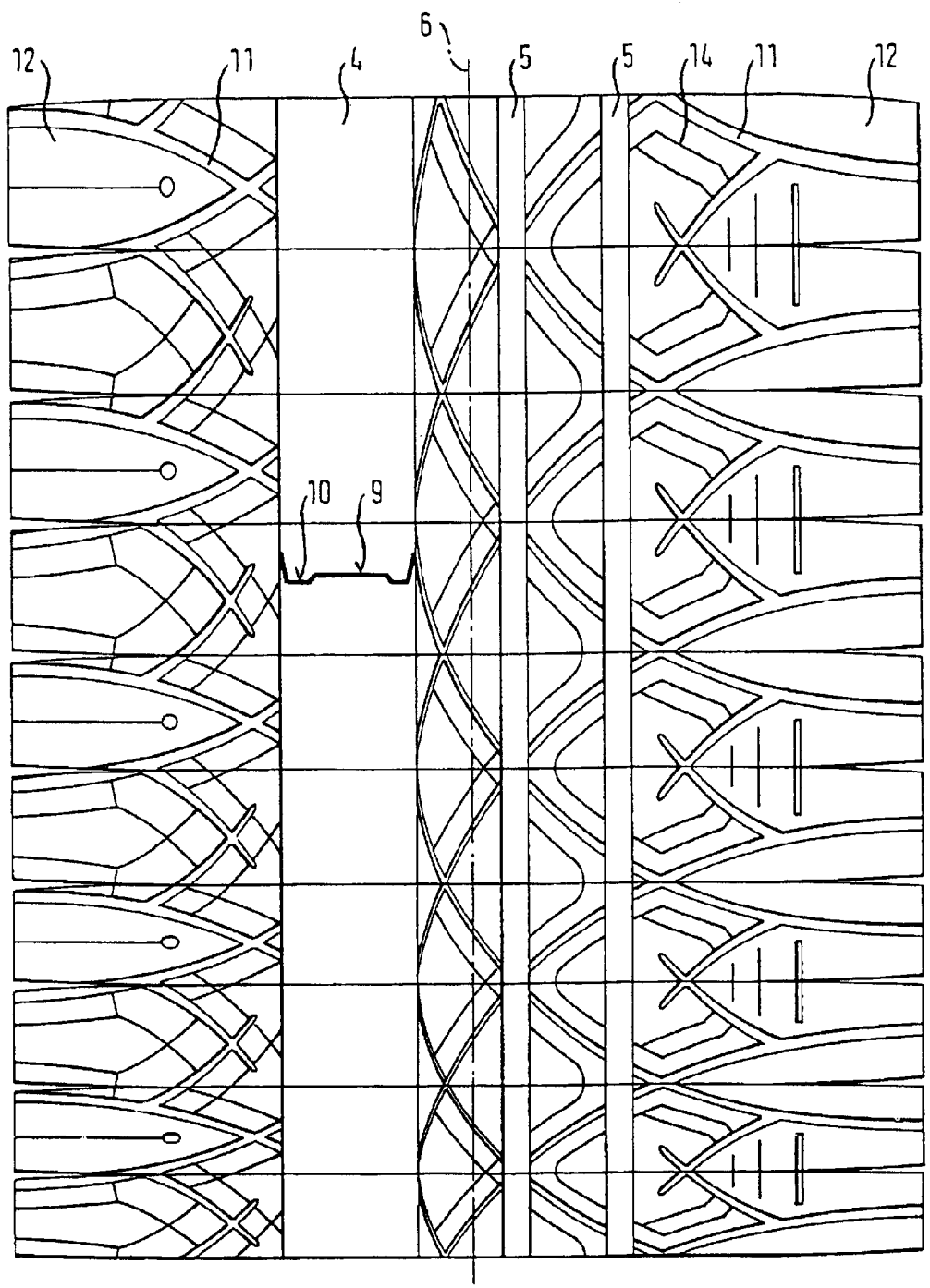
FIG. 4 a plan view of a section of a tread pattern in accordance with the invention.

FIG. 4 shows a specific example of a tread pattern design with a superwide groove 4 disposed in one tread half related to the circumferential plane 6 of the tyre and with two further circumferential grooves 5 arranged in the other tread half and having a width which respectively amounts to less than one third of the superwide groove 4, which has a minimum width of approximately 30 mm.

The circumferential grooves 4, 5 are, as a rule, formed as straight grooves, can, however, have a shape which deviates from the straight shape, for example an elongate wave or zigzag shape. The side walls of the circumferential grooves 4, 5 are slightly inclined and, in accordance with a preferred embodiment, the superwide groove 4 has a plateau 9 in its central region which is bounded on both sides by recessed regions 10.

The positive component of the tread provided with the superwide groove 4 and the narrow grooves 5 in comparison thereto is loosened up or subdivided into blocks by grooves 11 and fine cuts 14, the boundary edges of which extend in particular at an acute angle to the circumferential plane 6 of the tyre in the region between the tyre shoulders.

As can be seen from the illustration of FIG. 4, the grooves 11 are continuously curved over their length, with a part of these grooves 11 extending, starting from the tyre shoulder 14, in the form of a curved arc over the narrower circumferential grooves 5 up to the superwide groove 4 and being led back again to the starting shoulder region while retaining or enlarging the curvature. Grooves 14 curved in this manner are so offset relative to one another in the circumferential direction of the tyre that at least two similar half arc grooves are intersected by the half arc formed by a continuous grooves. Oppositely curved part grooves can branch off from these arcuately formed grooves 11 while forming a symmetrical design, with in each case two adjacent part grooves of this kind crossing each other and ending with a spacing from the circumferential grooves 4, 5.

The depths of the grooves 11 preferably differs over their length; however, the maximum groove depth of the superwide groove is as a rule always somewhat smaller than the depth of the circumferentially extending grooves 4, 5. Only in the shoulder regions 12 are the grooves 11 conducted in such a manner that block edges extending perpendicular to the central circumferential plane 6 result in a comparatively narrow outer region. Otherwise it is ensured, by the selected groove layout, that all the block edges which arise through the grooves extend obliquely to the central circumferential plane 6, so that striking edges which could increase the noise level are avoided.

What is claimed is:

1. Vehicle tyre having a non-uniformly profiled tread with respect to its center, characterized in that one tread half has at least one circumferential super wide groove having a width of at least 35 mm and in that there are at least two circumferential narrower grooves in the other tread half, said narrower grooves having a width of 15 mm or less and in that the super wide groove is disposed in the inner half of the one tread half, and the sidewalls of the circumferential grooves are slightly inclined with respect to the circumferential plane.

2. Vehicle tyre in accordance with claim 1, characterized in that the width of the narrower grooves is 10 mm or less.

3. Vehicle tyre in accordance with claim 1, characterized in that the grooves (4, 5) extending in the circumferential direction are substantially straight grooves.

4. Vehicle tyre in accordance with claim 1, characterized in that the spacings from the center of the tyre of the respective inwardly disposed side walls of the super wide groove and of the narrower groove adjacent to it in the other tyre tread half are at least substantially the same.

5. Vehicle tyre in accordance with claim 1, characterized in that the super wide groove has a varying depth when considered over its width, wherein the base of the super wide groove has a plateau in the central region, which is bounded on both sides by deepened regions.

6. Vehicle tyre in accordance with claim 1, characterized in that the super wide groove in the inwardly disposed tyre tread half has a width of approximately 40 mm and each of the narrower grooves have a width of approximately 8 mm in each case.

7. Vehicle tyre in accordance with claim 1, characterized in that the tread regions between the grooves and to the side of the grooves are provided with grooves and/or fine cuts which extend obliquely to the circumferential direction of the tyre at least outside of the shoulder regions of the tyre.

8. Vehicle tyre in accordance with claim 1, characterized in that the circumferential grooves are connected together at least in part by oblique grooves.

9. Vehicle tyre in accordance with claim 8, characterized in that the inclination of the oblique grooves relative to the tyre circumferential direction reduces towards the shoulders of the tyre.

10. Vehicle tyre in accordance with claim 8, characterized in that the grooves extending obliquely to the circumferential direction of the tyre have different depths over their longitudinal extent.

11. Vehicle tyre in accordance with claim 10, characterized in that at least the majority of the obliquely extending grooves is made continuously curved.

12. Vehicle tyre in accordance with claim 1, characterized in that additional circumferential grooves, the width of which only amounts to a fraction of the narrow grooves are provided in addition to the super wide groove and to the narrower grooves.

* * * * *